(No Model.)

J. A. SOWELL.
SICKLE BAR FOR HARVESTERS.

No. 416,963. Patented Dec. 10, 1889.

Witnesses,
Geo. H. Strong.

Inventor,
John A. Sowell
By Dewey & Co.
Attys

UNITED STATES PATENT OFFICE.

JOHN A. SOWELL, OF WHEATLAND, CALIFORNIA.

SICKLE-BAR FOR HARVESTERS.

SPECIFICATION forming part of Letters Patent No. 416,963, dated December 10, 1889.

Application filed September 2, 1889. Serial No. 322,794. (No model.)

*To all whom it may concern:*

Be it known that I, JOHN A. SOWELL, of Wheatland, Yuba county, State of California, have invented an Improvement in Sickle-Bars for Harvesters; and I hereby declare the following to be a full, clear, and exact description of the same.

My invention relates to the class of harvesting implements, mowing-machines, &c., and especially to the sickle-bars thereof; and my invention consists in the novel means for connecting the guards or fingers with the bar, hereinafter fully described, and specifically pointed out in the claims.

The object of my invention is to provide a simple and effective attachment of the sickle guards or fingers to the bar, one which will not work loose and may be readily applied.

Figure 1:
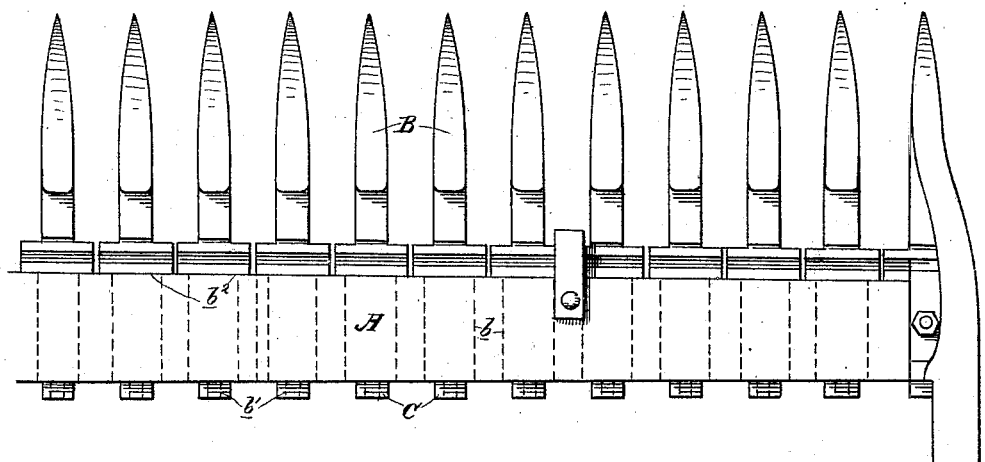
Figure 2:
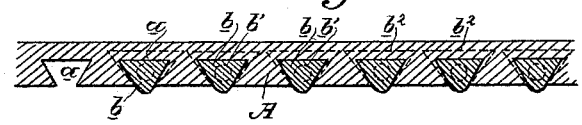
Figure 3:
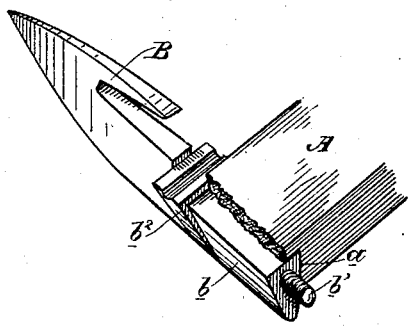

Referring to the accompanying drawings for a more complete explanation of my invention, Figure 1 is a plan view of a sickle-bar. Fig. 2 is a vertical longitudinal section through the bar. Fig. 3 is a view of one of the fingers.

A is the sickle-bar. On its under side it is provided with a series of dovetailed grooves $a$, which form seats for the shanks or stems of the guards or fingers. The guards or fingers, which are here designated by B, have shanks or stems $b$, which are made substantially triangular in cross-section and are seated in the dovetailed grooves $a$ of the bar. The rear ends $b'$ of the shanks or stems are reduced and threaded, and they are formed with a bearing-shoulder $b^2$ at the front, which rests against the front edge of the bar.

C are nuts screwed on the threaded rear ends $b'$ of the shanks or stems.

In fitting a guard or finger to its place its stem or shank is slid into the seat $a$ until its shoulder $b^2$ bears against the forward edge of bar A. Then the nut C is screwed onto the end $b'$ of the shank or stem and set up tight. The nut prevents the guard from moving forward, the shoulder prevents it from moving back, and the dovetailed seat $a$ prevents it from dropping down. Even if the nut should work loose, which is not likely, as it is out of the way and not liable to much friction, the guard will not have any tendency to move forward, as that would be in the direction of its work and pressure. The guards are easily inserted and as readily removed for any purpose.

This form of connection presents a degree of strength not possible if holes were simply made through the bar, for the bar is not weakened as much as if holes were made, and I can make the shanks or stems of the guards much heavier than if they had to pass through holes in the bar, for in the form shown they can project from their seats as much as may be required for the proper strength, and being underneath they will not be in the way.

Having thus described my invention, what I claim as new, and desire to secure by Letters Patent, is—

1. The sickle-bar having the series of dovetailed grooves $a$, in combination with the guards or fingers having shanks or stems corresponding to and seated in the grooves of the bar, and the nuts screwed upon the rear ends of the shanks or stems, substantially as described.

2. The sickle-bar having the series of dovetailed grooves $a$ in its under side, in combination with the guards or fingers having shanks or stems corresponding to and seated in the grooves of the bar, said shanks or stems having shoulders bearing against the forward edge of the bar and threaded rear ends, and the nuts screwed upon said rear ends and bearing against the rear edge of the bar, substantially as described.

In witness whereof I have hereunto set my hand.

JOHN A. SOWELL.

Witnesses:
S. H. NOURSE,
J. H. BLOOD.